United States Patent [19]

Suchenwirth

[11] Patent Number: 5,352,647
[45] Date of Patent: Oct. 4, 1994

[54] COMPOSITION FOR SEPARATING OUT NOXIOUS SUBSTANCES FROM GASES AND EXHAUST GASES

[75] Inventor: Hermann Suchenwirth, Grafrath, Fed. Rep. of Germany

[73] Assignee: FTU GmbH, Fed. Rep. of Germany

[21] Appl. No.: 19,198

[22] Filed: Feb. 17, 1993

Related U.S. Application Data

[62] Division of Ser. No. 517,934, May 2, 1990, Pat. No. 5,209,912.

[51] Int. Cl.⁵ ................... B01J 20/04; B01J 20/20; B01J 20/10
[52] U.S. Cl. ..................... 502/417; 502/400; 502/407; 502/411; 502/415
[58] Field of Search .............. 502/400, 411, 415, 417, 502/407

[56] References Cited

U.S. PATENT DOCUMENTS

| | | |
|---|---|---|
| 783,570 | 2/1905 | Ellis et al. . |
| 3,739,550 | 6/1973 | Martin et al. .................. 55/73 |
| 4,046,856 | 9/1977 | Itoo et al. .................. 423/166 |
| 4,061,716 | 12/1977 | McGauley .................. 423/244 |
| 4,101,631 | 7/1978 | Ambrosini et al. .................. 423/210 |
| 4,206,183 | 6/1980 | Yamada et al. .................. 423/210 |
| 4,323,544 | 4/1982 | Magder .................. 423/239 |
| 4,442,080 | 4/1984 | Donnelly et al. .................. 423/239 |
| 4,472,370 | 9/1984 | Miyata et al. .................. 423/636 |
| 4,526,703 | 7/1985 | Gebhard et al. .................. 423/244 |
| 4,532,115 | 7/1985 | Nishino et al. .................. 423/210 |
| 4,588,568 | 5/1986 | Pollmann .................. 423/244 |
| 4,629,130 | 12/1986 | Veltman .................. 423/160 |
| 4,636,379 | 1/1987 | Bastek et al. .................. 423/640 |
| 4,713,226 | 12/1987 | Veltman .................. 423/242 |
| 4,744,964 | 5/1988 | Kühl .................. 423/230 |
| 4,764,355 | 8/1988 | Romey et al. .................. 423/244 |
| 4,767,605 | 8/1988 | Lindbauer et al. .................. 423/239 |
| 4,810,478 | 3/1989 | Graf .................. 423/244 |
| 4,851,202 | 7/1989 | Fennemann .................. 423/239 |
| 4,997,803 | 3/1991 | van der Smissen et al. ........ 502/400 |

FOREIGN PATENT DOCUMENTS

| | | |
|---|---|---|
| 1099489 | 4/1981 | Canada . |
| 1295816 | 2/1992 | Canada . |
| 107582 | 5/1984 | European Pat. Off. . |
| 0173640 | 3/1986 | European Pat. Off. . |
| 162085 | 6/1986 | European Pat. Off. . |
| 201468 | 11/1986 | European Pat. Off. . |
| 0271994 | 6/1988 | European Pat. Off. ......... 502/400 |
| 619278 | 9/1935 | Fed. Rep. of Germany . |
| 906216 | 7/1949 | Fed. Rep. of Germany . |
| 1054071 | 4/1959 | Fed. Rep. of Germany . |
| 1769459 | 10/1971 | Fed. Rep. of Germany . |
| 2822086 | 11/1979 | Fed. Rep. of Germany . |
| 2904312 | 8/1980 | Fed. Rep. of Germany . |
| 2948305 | 6/1981 | Fed. Rep. of Germany . |
| 3136914 | 3/1983 | Fed. Rep. of Germany . |

(List continued on next page.)

*Primary Examiner*—Paul E. Konopka
*Attorney, Agent, or Firm*—Burns, Doane, Swecker & Mathis

[57] ABSTRACT

A composition for separating out volatile pollutants from gases and exhaust gases consists of calcium hydroxide and water-soluble salts of sulfur-containing compounds, e.g., mercaptans, sulfides, polysulfides, polythionates and thiosulfates, or elementary sulfur which are used in combination with surface-active substances.

Possible ways to produce the composition include adding the sulfur-containing compounds to the quicklime during slaking, to the slaking water, or, subsequent to slaking, to calcium hydroxide.

The compositions are used for removing the volatile heavy metals, particularly mercury, arsenic, cadmium, thallium, antimony and lead, at temperatures ranging from 20° to 400° C. For this purpose, the composition is blown as powder into the exhaust gas stream, and the resultant products are separated out at fabric filters. Upon addition of surface-active substances, volatile organic pollutants are removed simultaneously with the aforementioned inorganic pollutants.

20 Claims, No Drawings

FOREIGN PATENT DOCUMENTS

| | | |
|---|---|---|
| 3243788 | 5/1984 | Fed. Rep. of Germany . |
| 3447616 | 7/1985 | Fed. Rep. of Germany . |
| 3413243 | 11/1985 | Fed. Rep. of Germany . |
| 3429332 | 2/1986 | Fed. Rep. of Germany . |
| 3512169 | 10/1986 | Fed. Rep. of Germany . |
| 3541695 | 5/1987 | Fed. Rep. of Germany . |
| 3621981 | 9/1987 | Fed. Rep. of Germany . |
| 3543531 | 10/1987 | Fed. Rep. of Germany . |
| 3624300 | 1/1988 | Fed. Rep. of Germany . |
| 3641205 | 6/1988 | Fed. Rep. of Germany . |
| 3729482 | 6/1988 | Fed. Rep. of Germany . |
| 3644381 | 7/1988 | Fed. Rep. of Germany . |
| 3716566 | 12/1988 | Fed. Rep. of Germany . |
| 3717848 | 12/1988 | Fed. Rep. of Germany . |
| 3721317 | 1/1989 | Fed. Rep. of Germany . |
| 3726665 | 2/1989 | Fed. Rep. of Germany . |
| 3733208 | 6/1989 | Fed. Rep. of Germany . |
| 3815982 | 11/1989 | Fed. Rep. of Germany . |
| 3915934 | 11/1989 | Fed. Rep. of Germany . |
| 3919124 | 1/1990 | Fed. Rep. of Germany . |
| 3826971 | 2/1990 | Fed. Rep. of Germany . |
| 3935904 | 5/1990 | Fed. Rep. of Germany ...... 502/400 |
| 1434133 | 2/1966 | France . |
| 258343 | 11/1991 | Japan ................... 502/400 |
| WO85/02453 | 6/1986 | PCT Int'l Appl. . |
| 198006 | 8/1938 | Switzerland . |
| 649615 | 1/1951 | United Kingdom . |
| 655080 | 7/1951 | United Kingdom . |
| 1290356 | 9/1972 | United Kingdom . |
| 1433762 | 4/1976 | United Kingdom . |
| 2172277 | 9/1986 | United Kingdom . |
| 2174082 | 10/1986 | United Kingdom . |

COMPOSITION FOR SEPARATING OUT NOXIOUS SUBSTANCES FROM GASES AND EXHAUST GASES

CROSS-REFERENCE TO RELATED APPLICATIONS

This is a divisional of U.S. application Ser. No. 07/517,934, filed May 2, 1990, now U.S. Pat. No. 5,209,912 which is incorporated herein by reference for all purposes.

BACKGROUND OF THE INVENTION

The invention relates to a composition for removing noxious substances, particularly volatile heavy metals and/or organic pollutants, from gases and exhaust gases, and a process for making the composition.

In thermal processes, e.g., metallurgical processes, coal firing and waste incineration, exhaust gases are produced which contain large amounts of volatile heavy metals, such as cadmium, mercury, thallium, arsenic, antimony and lead. These substances are elemental heavy metals or salts thereof, preferably chlorides and oxides.

Usually, the gases are cooled, and the heavy metals are washed out in a wet process. In those cases where the heavy metals are present in elemental form, this process is often not effective. Mercury, for instance, is widely emitted in elemental form. It can not be removed from the gas in a wet process. Add to this the problem that volatile heavy metals are still emitted as aerosols and/or difficulties associated with the separation of fine powder after the wet process.

Another method consists of passing exhaust gas over activated charcoal filters. This process leads to a reduction in the content of volatile heavy metals, e.g., mercury. However, this process is also very expensive because it requires large amounts of highly active carbon and it involves the risk associated with smoldering fires in the bed of coal. Moreover, due to constant abrasion, fine dust containing heavy metals is emitted, which is difficult to separate.

Various attempts have been made in the past to transform the volatile heavy metals into sulfides which are not easily volatilized through the use of sulfur or sulfides, and to remove them from the gas stream.

In this process, sulfur is applied onto the activated charcoal and the gas stream is passed over it. The mercury is quite effectively, removed but the problems regarding self-ignition and the emission of fines remain.

Another state-of-the-art process utilizes suspensions of sulfur or sulfur compounds or aqueous solutions of thionic compounds, e.g., thiocarbamide. The solutions or suspensions are blown into the gas stream, and the resultant compounds of mercury and sulfur are separated out using electrostatic filters.

However, the 70% separation of mercury associated with such processes is too low to guarantee the limit of 0.200 mg/m$^3$. This insufficient Hg removal is probably due, inter alia, to the addition of water to the gas stream and the considerable content of strong acids in the gas stream when exhaust gases from refuse incinerating plants are treated.

Another alternative which has been proposed in the past involves blowing sulfur or water-insoluble sulfur compounds, e.g., ZnS, together with Ca(OH)$_2$ powder into the exhaust gas stream from refuse incinerating plants and to separate mercury therefrom. Although 1 g/m$^3$ ZnS at a temperature of from 200° to 250° C. was used, the separation of Hg was only 60% which is too low to ensure an Hg limit of 0.2 mg/m$^3$.

Consequently, there is the need to specifically separate, perhaps without cooling steps, volatile heavy metals, particularly mercury, in their various compounds and also as elements, as well as organic pollutants such as dioxines and furanes, from gas streams particularly those streams from refuse incinerating plants.

Another object is to develop a simple and inexpensive process for jointly separating out volatile pollutants and acidic constituents from gas streams. For this purpose, the reduction in the content of noxious substances in the exhaust gas stream has to be so great that the existing limits, e.g., for Hg, Cd, Tl and As, can be safely observed.

SUMMARY OF THE INVENTION

The process according to the present invention includes a first stage in which calcium hydroxides are produced which contain water-soluble salts of sulfur-containing substances which, in the second stage, are made to react with the volatile, i.e., vaporous, pollutants such as heavy metals contained in the exhaust gas in a dry or quasi-dry process, and then are separated out from the exhaust gas stream.

The water-soluble salts of sulfur-containing substances have the essential advantage that they can be dissolved in water during the slaking process or applied in finely dispersed form on the calcium hydroxide subsequent to the slaking process. The application on surface-active substances is also greatly facilitated. The fine distribution considerably promotes reactions with the heavy metals and the volatile organic pollutants.

Add to this that films of water, which proportionally dissolve the salts, form on both the calcium hydroxide and the surface-active substances. Heavy metals which are volatile as salts dissolve in the film of water and quickly react with the salts of the sulfur-containing compounds.

Precipitation of the volatile heavy metals is greatly facilitated by these mechanisms.

It is also possible, however, to use sulfur which is insoluble in water, which then combines with surface-active substances for better distribution or is applied in finely dispersed form on the calcium hydroxide during the slaking of quicklime.

DETAILED DESCRIPTION OF THE PREFERRED EMBODIMENTS

According to the invention, mercaptans, sulfides, polysulfides, polythionates and thiosulfates, particularly in the form of alkali and alkaline-earth compounds, are employed as water-soluble salts of sulfur-containing substances. Hydrogen sulfide can also be employed as the sulfide. Thiosulfate and polysulfide constitute a special group in this respect, as they give off sulfur under the influence of acids and/or heat, i.e., under reaction conditions.

The sulfur is produced in finely dispersed form and is well suited for binding volatile heavy metals of the most varying kinds. As the exhaust gas streams from refuse incinerating plants and from other combustion systems always contain acids, the separation of sulfur from thiosulfate is guaranteed.

A further class of compounds which can be employed are water-soluble mercaptans, i.e., organic compounds comprising hydrogen sulfide groups.

A particularly preferred group of water-soluble, sulfur-containing compounds is represented by hydrogen sulfide and the water-soluble sulfides. They react with the volatile heavy metals and form insoluble sulfides which are not easily volatilized. Sodium hydrogen sulfide and sodium sulfide as well as other alkali and alkaline-earth sulfides are included among suitable water-soluble sulfides.

The sulfides have the drawback that at high temperatures, e.g., 200° C., they are oxidized to a large extent and are therefore no longer available to the separation of the volatile heavy metals.

The polysulfides of the general formula $M_2S_n$, wherein n is 2, 3, 4, 5 or more and M symbolizes metals, are also well suited as a group capable of giving off sulfur. Under the influence of acids, these polysulfides give off sulfur which, together with the hydrogen sulfide which is also released, is capable of very actively acting on the volatile heavy metals.

The salts of polythionic acids can also be used as sulfur-releasing compounds. Under the influence of acids, the salts of polythionic acids decompose into sulfur, sulfurous acid and sulfuric acid. The sulfur which is thus set free is also excellently suited for binding volatile heavy metals contained in gas and exhaust gas streams.

A preferred process for separating out volatile heavy metals from gases and exhaust gases according to the invention comprises employing the aforementioned water-soluble sulfur compounds together with calcium hydroxide, e.g., either applied on calcium hydroxide or mixed with calcium hydroxide.

Dry powders or powders containing water, on the basis of calcium hydroxide, which are to be used for the removal of heavy metals from gases and exhaust gases are produced, according to the invention, by adding water-soluble salts of sulfur-containing substances, or surface-active substances and water-soluble salts of sulfur-containing substances, or sulfur on its own, or sulfur applied on surface-active substances to the quicklime. This addition can occur prior to the slaking of the quicklime and/or to the slaking water during the slaking process and/or to the calcium hydroxide subsequent to the slaking process.

The combination of sulfur-containing compounds with calcium hydroxide is preferably brought about by adding the sulfur-containing compounds to the water required for slaking.

One embodiment of the present invention, for example, consists of slaking thiosulfates in the slaking water and then using the solution for slaking quicklime. The thiosulfate is evenly dispersed in very fine form over the calcium hydroxide and is therefore available in a particularly reactive form for further conversion.

The slaking process may also comprise the steps of initial, partial slaking with pure water and subsequent, complete slaking with water containing the water-soluble salts of sulfur-containing substances.

It is also possible, however, to apply the above-mentioned sulfur-containing compounds either in solid form as fine powders or in dissolved, concentrated form on calcium hydroxide.

If they are subsequently applied as solutions on calcium hydroxide, a calcium hydroxide powder which may contain up to 3 wt. %, occasionally up to 5 wt. %, water is obtained. Preferably, the water content, if water is present, is 1–5 wt. %, more preferably, 0.5–3 wt. %.

Another possible method for combining the sulfur-containing compounds and calcium hydroxide is to add these substances to the quicklime and subsequently slake the latter. In any of these cases, the sulfur-containing compounds are present in finely dispersed form in calcium hydroxide. This production process has the essential advantage that quicklime and the sulfur-containing compounds are intimately pre-mixed, e.g., in lime works, and then slaked at the user's to form, e.g., milk of lime. This makes it superfluous for the user to provide additional facilities.

The content of water-soluble salts of the sulfur-containing substances lies in the range of from 0.01 to 5 wt. %, preferably 0.1 to 1 wt. %, especially 0.2 to 0.6 wt. %.

In accordance with the quantity of volatile heavy metals contained in the exhaust gases, highly doped calcium hydroxides or doped $Ca(OH)_2$ composition, the amount of which varies in response to the adjustment during the course of operation, can be employed.

The combination of the sulfur-containing compounds mentioned with calcium hydroxide is particularly suitable when hydrogen sulfide or substances forming hydrogen sulfide, e.g., polysulfides or polythionic acids, or hydrogen sulfide and water-soluble sulfides are used. Because calcium hydroxide is employed in a large excess relative to the sulfur-containing compounds, released hydrogen sulfide compounds can be immediately neutralized as acids by calcium hydroxide. On further influence of oxygen at elevated temperature, the sulfides are then transformed into odorless compounds, particularly sulfites and sulfates.

The composition according to the invention can also include 0.5 to 10 wt. % of surface-active substances.

The suitable surface-active substances in question are activated charcoal, open-hearth lignite coke, silica gel, crystalline silica and/or activated aluminum oxide.

The sulfur-containing substances can be applied on the surface-active substances via aqueous solutions or mechanically mixed with the surface-active substances.

Preferably, they are best applied on the surface-active substances in an independent processing stage, but they can also be applied successfully during the slaking process.

This can be accomplished by mixing the water-soluble salts of sulfur-containing substances and the surface-active substances with quicklime and then slaking the latter. It is also possible, however, to mix quicklime with the surface-active substances and subsequently slake the mixture with water containing the salts of the substances indicated.

The water-soluble sulfides, polysulfides, mercaptans, thiosulfates and polythionic acids can be readily applied on open-hearth lignite coke, for example, and produced in dry form by vaporization of the water. If necessary, these sulfur-releasing compounds can already be pre-treated with acids so that sulfur is present in finely dispersed form on the surface-active substances.

Surface-active substances are well suited for separating out volatile heavy metals. In most cases, they are capable of binding heavy metals on their own, but this effect can be greatly increased by the presence of the sulfur-containing compounds.

The surface-active substances also effect the separation of most of the volatile organic pollutants. These include, in particular, ecotoxic pollutants such as chlorinated dioxines and furanes, chlorinated hydrocarbons like hexachlorobenzene, hexachlorocyclohexane, trichloroethylene and perchloroethylene, polyaromatic hydrocarbons like benzo(a)pyrene, and other volatile pollutants, as indicated in Classes I to III of organic pollutants, Classes I to III of the carcinogenic substances and Classes I to IV of inorganic harmful substances of "Technische Anleitung Luft (TA Luft)" of the Federal Republic of Germany, (1986).

Another way of combining surface-active substances which are in the solid form and water-soluble salts of sulfur-containing substances which are in finely dispersed form, is to subject them to a pulverization or a mixing process.

It is also advantageous to employ the combination of calcium hydroxide, surface-active substances and finely powdered sulfur. The sulfur content is 0.5 to 5 wt. %. Production is accomplished either in the process of slaking quicklime or subsequently by adding a mixture of powdered sulfur and surface-active substance.

The use of a mixture consisting of $Ca(OH)_2$, surface-active substance and sulfur has considerable advantages over state-of-the-art processes. The essential advantage is that the burning of sulfur does not have any adverse consequences at temperatures which the exhaust gases are purified, e.g., from 150° to 400° C. Nascent $SO_2$ is immediately absorbed by $Ca(OH)_2$; sulfur burning on a fabric filter does not cause perforation of the filter since $Ca(OH)_2$ powder forms a protective layer.

An embodiment of the invention consists in treating the gas or exhaust gas streams with sulfur compounds at a temperature in the range of from 0° to 400° C., preferably 20° to 300° C., especially 80° to 250° C.

At temperatures higher than 400° C., there is the risk of quick combustion of the sulfur-containing compounds. Preferably, the temperature is in the range of from 20 to about 300° C. Most exhaust gases have a temperature of from 200° to 250° C. when they exit from boilers subsequent to combustion plants to the purification plants. It is therefore of particular interest that the volatile pollutants are separated out from the hot exhaust gases at 200° to 250° C. Sulfur, the thiosulfates, polysulfides and the salts of polythionic acids are suited for this purpose. Particularly well suited to this effect are sulfur and the thiosulfates, as they are stable with respect to temperature and are capable of quickly reacting with the volatile heavy metals at high temperatures.

The ratio of the sulfur compounds to the heavy metals which are to be separated out is characterized in that the heavy metals which are present in very small amounts can be reacted with a considerable surplus of sulfur-containing compounds without involving high costs.

According to the invention, it is advisable to use sodium thiosulfate on mercury in an amount that is 1 to 1000 times, preferably 25 to 500 times, the amount of mercury. By the term "amount" it is understood that in the case of a multiplying factor of 1, a unit of weight of mercury is reacted with the same unit of weight of sodium thiosulfate.

Preferably, the amount of sodium thiosulfate is 25 to 500 times the amount of mercury. When such a stoichiometric ratio is employed, the volatile heavy metals can be reliably removed without rendering the process uneconomical.

Furthermore, when sulfur is employed, the amount ranges of from 50 to 2000, preferably 25 to 500. "Amount" is employed in the same manner as discussed above.

The advantage of sulfur-releasing compounds such as thiosulfate resides precisely in the fact that the sulfur is present in finely dispersed form upon decomposition under the influence of acids.

The essential advantage of the process according to the invention can be seen in the fact that the water-soluble salts of sulfur-containing substances used for binding the volatile heavy metals contained in the exhaust gases can be introduced in the gas stream with considerable amounts of $Ca(OH)_2$ powder as carrier. This provides an efficient distribution of the sulfur-containing substances in the gas stream. Besides, upon using a fabric filter, a reaction layer is provided which the exhaust gas to be purified has to pass.

Accordingly, $Ca(OH)_2$ not only acts as an acid binding agent but also provides reaction surfaces and opportunities for the sulfur-containing substances to react.

$Ca(OH)_2$ further has the capability of capturing and neutralizing oxidation products originating from sulfur or the sulfur-containing substances, e.g., $SO_2$ or $SO_3$. The sulfur-containing substances can therefore be used in great surplus relative to the volatile heavy metals, as emission of $SO_2$ and $SO_3$ does not have to be expected. Consequently, separation of the volatile heavy metals can be accomplished at levels up to 100% without encountering problems.

Even at the high reaction temperatures of 200° C., the rate of separation of the volatile heavy metals is over 70%.

By analogy, the features according to the invention can be transferred to spray sorption. This means that the composition according to the invention can be suspended in water and blown into the gas or exhaust gas stream to be purified. It is also possible to use quicklime to which the water-soluble salts of sulfur-containing substances have been added. Upon the production of milk of lime in the plant a suspension is obtained which can also be employed in the present invention.

The reaction products formed from the sulfur compounds and the volatile heavy metals as well as the noxious substances bonded to the surface-active substances can be separated by employing conventional filters, preferably fabric filters or electrostatic filters, in cyclones or in the wet process.

The method is suited for treating gases and exhaust gases from production processes, e.g., metallurgical processes, chlorine-alkali electrolysis, blast-furnace processes, and gases from power plants, refuse incinerating plants, special waste incinerating plants, plants of glass and ceramics industries, firing plants, aluminum remelting plants and combustion plants.

It can be used for exhaust gas purification processing including dry sorption, dry sorption with water conditioning, and spray sorption.

EXAMPLE 1

111 mg sodium thiosulfate was dissolved in 17 ml water. 28 g quicklime was slaked therewith. The resultant dry calcium hydroxide was used for exhaust gas purification.

At a temperature of 192° C., 10.5 l of an exhaust gas of the following composition was passed over 265 mg of the following product:

| | |
|---|---|
| hydrogen | 80 vol. % |

| | |
|---|---|
| oxygen | 20 vol. % |
| moisture | 289 mg/l |
| HCl | 12.1 mg/l |
| HgCl₂ | 0.7 μg/l. |

Out of a total of 7.4 μg HgCl₂, 5.7 μg was separated out. This constitutes a degree of separation of 76.8%.

EXAMPLE 2

28 g quicklime was mixed with 0.37 g sublimed sulfur and then slaked with 17 ml water. A slightly yellow, anhydrous product was obtained.

At a temperature of 186° C., 11 l of an exhaust gas of the following composition was passed over 268 mg of the following product:

| | |
|---|---|
| hydrogen | 80 vol. % |
| oxygen | 20 vol. % |
| moisture | 273 mg/l |
| HCl | 11.5 mg/l |
| HgCl₂ | 0.67 μg/l. |

Out of a total of 7.4 μg HgCl₂, 5.4 μg was removed from the exhaust gas. This constitutes a degree of separation of 73.3%.

EXAMPLE 3

1.85 g of finely powdered open-hearth lignite coke was mixed with 0.37 g sublimed sulfur. This mixture was then mixed with 28 g quicklime. Said 28 g quicklime was slaked with 17 ml water. An anhydrous product was obtained.

At a temperature of 190° C., 10.3 l of an exhaust gas of the following composition was passed over 283 mg of the following product:

| | |
|---|---|
| hydrogen | 80 vol. % |
| oxygen | 20 vol. % |
| moisture | 292 mg/l |
| HCl | 12.3 mg/l |
| HgCl₂ | 0.72 μg/l. |

Out of a total of 7.4 μg HgCl₂, 6.2 μg was removed. This constitutes a degree of separation of 84.2%.

I claim:

1. A composition for removing heavy metals from exhaust gases comprising a powder of calcium hydroxide and 0.01 to 5 wt. %, based on the calcium hydroxide, of at least one water-soluble salt of a sulfur containing substance which sulfur-containing substances are selected from the group consisting of polysulfides, polythionates and thiosulfates.

2. The composition according to claim 1 wherein the at least one water-soluble salt of sulfur-containing substances are present in an amount of 0.1 to 1 wt. % of the calcium hydroxide.

3. The composition according to claim 1 wherein the at least one water-soluble salt of sulfur-containing substances are present in an amount of 0.2 to 0.6% by weight of the calcium hydroxide.

4. The composition according to claim 1 wherein the powder has a grain size which is smaller than 200 microns.

5. The composition according to claim 1 further comprising a 0.5 to 10% by weight of at least one surface-active substance selected from the group consisting of active carbon, open hearth lignite coke, activated aluminum oxide, silica gel and crystalline silica.

6. The composition according to claim 5 wherein the at least one water-soluble salt of sulfur-containing substances are applied onto the surface-active substances.

7. The composition according to claim 5 wherein the at least one water-soluble salt of sulfur-containing substances are mixed with the surface-active substances.

8. The composition according to claim 1 wherein the at least one water-soluble salt of sulfur-containing substances are salts of alkali or alkaline earth compounds.

9. The composition according to claim 1 further comprising water which is present in an amount of 1–5 wt. % based on the calcium hydroxide.

10. The composition according to claim 1 further comprising water which is present in an amount of 0.5–3 wt. % based on the calcium hydroxide.

11. A composition for removing heavy metals and/or organic pollutants from exhaust gases comprising a powder of calcium hydroxide, 0.5 to 10% by weight, based on the calcium hydroxide, of at least one surface-active substance and 0.5 to 5% by weight, based on calcium hydroxide, of powdered sulfur, with the at least one surface active substance being selected from the group consisting of active carbon, open hearth, lignite coke, activated aluminum oxide, silica gel and crystalline silica.

12. The composition according to claim 11 wherein the powdered sulfur is applied onto the surface-active substance or mixed with the calcium hydroxide and the surface-active substance.

13. The composition according to claim 11 further comprising water which is present in an amount of 1–5 wt. % based on the calcium hydroxide.

14. The composition according to claim 11 further comprising water which is present in an amount of 0.5–3 wt. % based on the calcium hydroxide.

15. A process for making dry or hydrous powders of a calcium hydroxide composition which is useful for removing heavy metals and/or organic pollutants from exhaust gases, comprises slaking quicklime in the presence of a sulfur compound, which sulfur compound is a water-soluble salt of a sulfur containing substance, a combination of a water-soluble salt of a sulfur containing substance and a surface active substance, sulfur, or sulfur applied on a surface active substance, wherein the sulfur containing substance is selected from the group consisting of polysulfides, polythionates and thiosulfates and the surface active substance is selected from the group consisting of active carbon, open hearth lignite coke, activated aluminum oxide, silica gel and crystalline silica.

16. The process according to claim 15 wherein the sulfur compound is added to the quicklime prior to the slaking thereof and/or to slaking water during the slaking process.

17. The process according to claim 16 wherein the process further comprises dissolving water soluble salts of sulfur containing substances in water and applying the substances onto calcium hydroxide.

18. A process for making dry or hydrous powders of a calcium hydroxide composition which is useful for removing heavy metals and/or organic pollutants from exhaust gases comprises slaking quicklime so as to form calcium hydroxide and then introducing a sulfur compound onto the calcium hydroxide, which sulfur compound is a water soluble salt of a sulfur containing substance, a combination of a water soluble salt of a sulfur containing substance and at least one surface active substance, sulfur, or sulfur applied on a surface active substance, wherein the sulfur containing substance is selected from the group consisting of polysulfides, polythionates, and thiosulfates, and the surface active substance is selected from the group consisting of active carbon, open hearth lignite coal, activated aluminum oxide, silica gel and crystalline silica.

19. The process according to claim 18 wherein the sulfur compound is also introduced into the quicklime prior to a slaking thereof and/or to the slaking water during the slaking process.

20. The process according to claim 19 wherein the water soluble salt of sulfur containing substances are dissolved in water and then applied onto calcium hydroxide.

* * * * *